Aug. 18, 1964
E. V. GOODWILLER
3,145,018
SHAFT LOCKING DEVICE
Filed Feb. 13, 1961
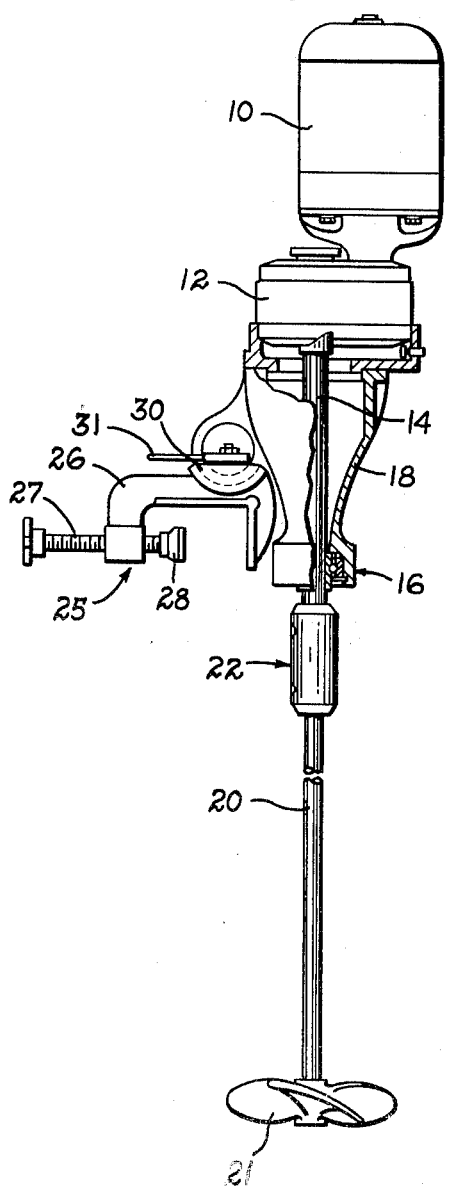
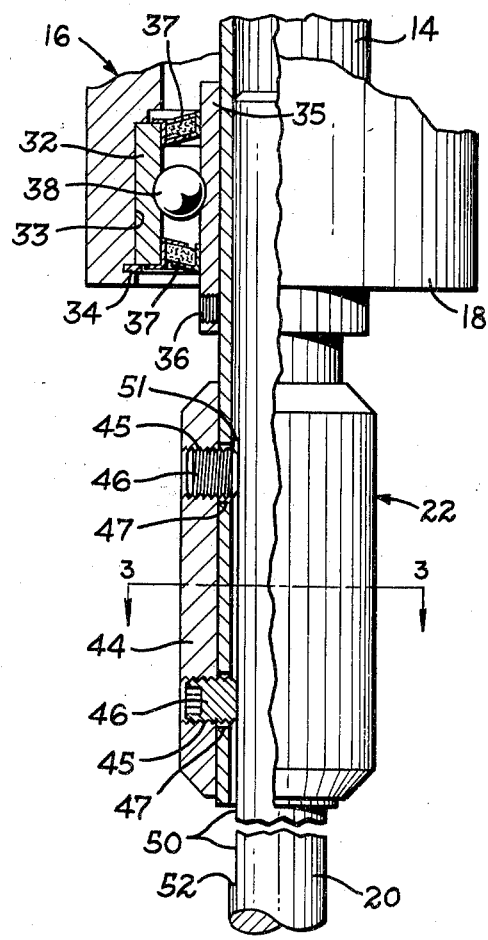
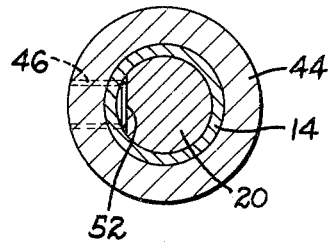
INVENTOR.
ELBERT V. GOODWILLER
BY
*Marechal, Biebel, French & Bugg*
ATTORNEYS

United States Patent Office 3,145,018
Patented Aug. 18, 1964

3,145,018
SHAFT LOCKING DEVICE
Elbert V. Goodwiller, Dayton, Ohio, assignor to Chemineer, Inc., Dayton, Ohio, a corporation of Ohio
Filed Feb. 13, 1961, Ser. No. 89,002
6 Claims. (Cl. 259—135)

This invention relates to a shaft locking device and more particularly to an adjustable shaft locking device adapted to be employed with portable agitators.

In agitators of the portable type which are designed to be shifted from one tank or installation to another, the drive shaft is usually secured to the drive unit in such manner as to allow removal of the shaft during shifting of the unit. For example, in the case of an agitator wherein the shaft is driven directly off the motor, a sleeve coupling may be affixed to the drive shaft of the motor and a hollow tube may be affixed to the sleeve coupling, while in instances where a gear reduction is employed with a motor, a hollow tube may be secured to the output of the gear reducer. In each case, the agitator shaft which carries the propeller at one end thereof is secured in driving relationship to the hollow tube.

A portable agitator unit may be employed with tanks of different depth, or in the same tank with different liquid levels, and it is the practice in the art to employ a coupling between the hollow shaft and the agitator shaft which will allow some adjustment in the overall length of the agitator shaft by providing a telescoping fit between the hollow tube and solid shaft. A coupling which supports the shaft at only one point along the length provides poor support and allows varying degrees of shaft whip, depending on whether the agitator shaft is in the long or short extremity of its adjustment. When such shaft whip develops during operation of the agitator, damage to the shaft, and subsequently to the lower motor bearing may result, if the shaft is driven directly from a motor, or the outboard bearing in the gear reducer may be damaged if the shaft is driven off a gear reducer.

Thus it is a primary object of this invention to provide a shaft locking device which fixes the driven shaft to the hollow tube along a substantial portion of its length to eliminate shaft whip and assure positive power transmission from the hollow tube to the driven shaft.

This primary object has been successfully accomplished in accordance with the present invention by the provision of a novel collet assembly which is positioned in fixed relation on the hollow tube to secure the driven shaft thereto along a substantial portion of its length. A plurality of spaced set screws are provided to secure the collet to the hollow tube, and these screws engage the driven shaft along a milled flat portion thereof to interconnect the hollow tube in driving relation with the driven shaft. The driven shaft is preferably formed with a flat section extending several inches in length, depending on the size of the agitator assembly, so as to provide an adjustment range which is within safe limits while at the same time eliminating over-stressing of the hollow tube and also eliminating shaft whip.

Another object of this invention is the provision of a portable agitator assembly provided with a novel shaft locking device which substantially eliminates shaft whip thereby protecting the bearing units and the associated gears where the gear reduction unit is employed.

It is another object of this invention to provide a novel two-point shaft locking device which cooperates with a milled flat portion on a cylindrical solid shaft to assure efficient power transmission from the power source to the driven shaft.

A further object of this invention is the provision of a two-point shaft locking device having a controlled limit of adjustment such that as the shaft is positioned in the long extremity of its adjustment, a sufficient length of the solid shaft is positioned within the hollow tube thereby preserving alignment between the shaft and the tube and avoiding serious bending stresses in the tube, and wherein positive engagement between the hollow tube and the solid shaft is assured as the overall length of the shaft is adjusted.

A further object of this invention is to provide a shaft locking arrangement for securing a solid shaft to a driven hollow tube which compensates for any eccentricity in the bore of the tube and which compensates for any excessive spacing between the inner diameter of the tube and the outer diameter of the shaft.

It is a further object of this invention to provide a shaft locking assembly which is simple and fast in operation, which requires no special tools, and wherein there is ease of maintenance.

A still further object of this invention is the provision of a shaft locking device for use with a shaft having a milled flat formed thereon such that the factory alignment of the shaft may be maintained during removal or adjustment of the shaft by employing a shaft locking device including set screws which engage the shaft along the milled portion thereof thereby to position the shaft in substantially the same rotational position with respect to the tube as was determined by the factory alignment thereof.

Other objects and advantages of the present invention will be apparent from the following description, the accompanying drawing and the appended claims.

In the drawing—

FIG. 1 is a view partly in section and partly in elevation of a portable agitator incorporating the novel shaft locking device of this invention;

FIG. 2 is an enlarged view partly in section and partly in elevation of the novel shaft locking device shown in FIG. 1; and FIG. 3 is a view in section taken generally along the line 3—3 of FIG. 2.

Referring to the drawing, which illustrates a preferred embodiment of the invention, FIG. 1 shows a conventional motor assembly 10, the output of which is connected to a conventional gear reducer 12. A hollow tube 14 is connected at one end to the output of the gear reducer and supported at the other end by an outboard bearing assembly 16 positioned within the agitator housing 18. A solid vertically depending shaft 20 having a propeller 21 at one end thereof is secured in driving relation to the hollow tube 14 by a shaft coupling assembly 22.

The agitator unit is mounted on a tank wall or other suitable supporting member by a clamp assembly 25 including a clamp 26, a clamp screw 27 and a clamp shoe 28. Means including a ball shoe 30 and wrench 31 are provided for allowing pivotal movement of the agitator unit with respect to the tank wall or other supporting member.

The outboard bearing assembly 16, which is of conventional design, is shown in detail in FIG. 2, and includes an annular bearing race 32 positioned within a counterbore 33 located in the lower end of the agitator housing 18. The bearing race 32 is held in place by a snap ring 34 which holds the race member within the bore 33. A second race member 35 is secured to the hollow tube 14, for rotation therewith, by a set screw 36 or other suitable means. The usual annular dust seals 37 are interposed between each of the race members 32 and 35 and positioned on each side of the bearing balls 38 (one of which is shown).

It will be noted that the outboard bearing assembly 16 is positioned relatively close to the free end of the hollow tube 14 and accordingly the first harmful effects of shaft whip are damage to this bearing. One of the causes of shaft whip is failure to provide a proper lock between the hollow tube 14 and the driven shaft 20. The effects of such undesirable whipping are all the more multiplied when the agitator shaft 20 is secured to the tube 14 at the full length of its adjustment to provide a longer overall shaft length. With the shaft thus extended to the full length of its adjustment, the upper end of the shaft terminates at a point approximately in line with the outboard bearing assembly 16.

A relatively small amount of shaft whip produces a significant radial force at the end of the shaft positioned in the hollow tube since the pivot point for such shaft whip is the point of connection between the hollow tube and the shaft itself. For example, if a six-foot shaft is attached to a hollow tube at a point approximately five and one-half feet from the propeller end, then approximately four to six inches of the shaft will project up into the hollow tube. The fulcrum point is located at the bottom end of the hollow tube. As the shaft whips, the major portion of the radial force is felt at the upper end of that portion of the solid shaft which is in the hollow tube, and is approximately ten times the magnitude of the radial force at the lowest extremity of the shaft. Thus a small amount of shaft whip results in significant stress on the hollow tube and the bearing assembly.

The novel shaft locking assembly of this invention shown in FIGS. 2 and 3 is designed to reduce shaft whip to a minimum by securing the shaft 20 to the hollow tube 14 along several inches of length so as to provide positive power transmission from the tube to the shaft. This assembly includes a collet 44 which has an inner diameter providing approximately a slip fit over the tube 14. The collet 44 is provided with a pair of axially spaced radial bores 45 therethrough which are threaded to receive set screws 46, and the tube 14 has a pair of similarly spaced radial bores 47 of sufficient diameter to receive the set screws 46 freely therethrough. The holes 45 and 47 are so arranged that the collet 44 may be positioned near the terminal end of the tube.

The agitator shaft 20 is preferably formed with a milled flat section 50 spaced from the end of the shaft and extending about six to twelve inches in length for allowing adjustment of the shaft 20 as the agitator is moved from one installation to another. The diameter of the shaft 20 is approximately the same as the inner diameter of the tube 14, and hence as the set screws 46 are tightened in the collet 44, each screw will abut the flat on the shaft and firmly position the shaft within the tube 14. The set screws 46 are preferably of the shake-proof type such as the set screws sold under the trade name "Nylock."

The assembly of the shaft 20 within the tube 14 is accomplished by backing off the set screws 46 with a standard Allen wrench of proper size to provide clearance between the face of the screws and the outer cylindrical surface of the shaft. The agitator shaft is then inserted within the tube 14 and the flat is arranged so that it faces the set screws which are subsequently tightened and engage the flat milled portion 50 of the shaft.

This relatively simple assembly procedure offers the advantage of eliminating the use of large wrenches and twisting the shaft and thereby eliminates the possibility of bending or damaging the shaft. Moreover, since the set screws bear gainst the flat of the shaft at spaced points along the length thereof, the shaft is positioned firmly with respect to the tube, and torque is transmitted positively from the tube to the shaft.

Adjustment of the shaft 20 within the tube 14 to increase or decrease the overall length of the shaft is accomplished by turning each of the set screws 46 approximately a quarter turn and sliding the shaft within the tube 14 an appropriate amount in accordance with the desired overall shaft length. Subsequently, the set screws are retightened to urge the face of each of the screws into engagement with the flat on the shaft. The quarter turn of the set screws during adjustment does not move them a distance sufficient to clear the outer cylindrical surface of the shaft, and thus it is possible to effect accurate control of the limits of adjustment so as to eliminate any possibility of positioning the shaft 20 to such a low position as to over-stress the tube, and also to prevent accidental dropping of the shaft.

In accordance with the present invention, the flat milled portion 50 is so positioned along the shaft so that the length of the shaft above the edge 51 of the milled flat is sufficient to reach at least up to the outboard bearing 16. The set screws, when turned a quarter turn to release the shaft, do not allow the shaft to come free of the tube, and as the shaft moves downward, the upper screw will project into the tube a distance sufficient to engage the edge 51 of the flat 50 to prevent further downward movement of the shaft. Thus it can be seen that its is virtually impossible to position the shaft at too low a position within the tube, provided the set screws are turned the minimum during release of the shaft. Similarly, it is virtually impossible to move the shaft too far into the tube 14 since the lower set screw 46 will engage the other edge 52 of the flat 50.

The present invention has special advantages for use in instances where the tube 14 may have an outer diameter slightly larger than the outer diameter of the solid shaft 20 and/or where the bore of the drive tube may be slightly eccentric with respect to the axis of the tube. Each of the above conditions in the construction of the drive tube would normally lead to shaft whip which becomes magnified due to the fact that rotation of the tube, if it is eccentric, causes even greater eccentric movement at the propeller end of the shaft and ultimately results in damage to bearings and gears.

If the inner diameter of the tube 14 is slightly larger than the outer diameter of the shaft, and the set screws 46 tightly abut against the shaft flat 50 locking the shaft 20 against the inside of the tube 14 opposite the set screws, the actual drive axis will be slightly off center with respect to the true drive axis of the tube and shaft whip may result as above described. On the other hand, should the bore of the tube be slightly eccentric, the situation is again presented where the drive axis is slightly off with respect to the true drive axis. In either case, shaft whip is produced as above described.

In accordance with the present invention, the effects of these two conditions are offset against each other so that their net effect is minimized, thus substantially eliminating undesirable whipping of the shaft. This desirable result has been accomplished in accordance with the present invention by placing the apertures 47 in the thinner section of the tube 14 so that the set screws 46 will urge the shaft 20 against the thicker portion of the tube. In this manner, it is possible to compensate for the space between the outer surface of the solid shaft and the inner surface of the tube which arises from having an inner diameter of the tube greater than the outer diameter of the shaft.

An alternate mode of eliminating shaft whip attributable to such conditions in the drive tube involves fabrication of a hollow tube by a precise machining operation such that the inner diameter of the tube is large enough to clear the outside diameter of the shaft by a relatively small distance, for example, one-thousandth of an inch, and wherein a bore is provided which is not eccentric with respect to the center axis of the tube. Such precision, however, leads to considerable expense in fabrication of the drive tube and may be eliminated by compensating for bore eccentricity and larger bore diameter as above described.

The novel shaft locking device constructed in accordance with the present invention serves to increase the efficiency of the agitator unit by positively transmitting the power from the hollow tube to the solid shaft and eliminates any shaft whip which might damage the shaft, tube, or drive bearings. Positive power transmission is accomplished by a two point lock device which facilitates adjustment of the shaft without the use of special or bulky tools. Further such adjustment is controlled as above described to eliminate the possibility of positioning the shafts such that the tube will be over-stressed.

Another advantage accruing from the use of a shaft locking device constructed in accordance with the present invention is the maintenance of the factory set alignment of the shaft within the hollow tube. This advantage may be more clearly understood with reference to shaft manufacturing techniques. With the prior art shafts formed without a milled flat thereon, that is, those which are cylindrical, it has been the practice to insert the shaft within the hollow tube and test the shaft to determine the extent of shaft whip attributable to additive machining tolerances developed during shaft manufacture. Once the extent of shaft whip has been determined, steps are taken to offset such machining tolerances by employing a shaft straightening process which offsets the result of the additive machining tolerances. This may be accomplished, for example, by deliberately bending the shaft slightly so as to offset the force of any whip resulting from imperfections during shaft manufacture.

After the shaft has been treated to eliminate the source of shaft whip arising from machining tolerances, the shaft is assembled within the tube in such position that the shaft runs substantially true with respect to the true running axis. If such a shaft were to be rotated 180° within the tube, the shaft imperfections would tend to become additive with respect to the bends put in the shaft to eliminate shaft whip, thereby resulting in shaft whip which is the additive of that produced by the manufacturing tolerances and that attempted to be eliminated by the shaft straightening process. Accordingly, it can be seen that with a cylindrical shaft, care must be taken during adjustment and removal thereof to assure the same rotational orientation of the shaft as was determined during shaft alignment procedures. While this may be accomplished by providing scribe marks on the shaft, assembly of the shaft into the tube then becomes a two-man operation wherein one holds and aligns the scribe marks while the second fastens the shaft within the tube.

The above disadvantage has been overcome in accordance with the present invention by employing a milled flat 50 on the surface of the shaft which is formed thereon before the shaft is assembled to the agitator and tested. Thereafter, the shaft is assembled to the agitator as above described and any corrections which are indicated are incorporated into the shaft by way of appropriate bending, as above described, and the shaft is thereafter reassembled to the agitator and retested. It can be seen that due to the presence of a milled flat, rotational orientation of the shaft during adjustment or assembly of the shaft within the tube is maintained by inserting the shaft into the tube in such fashion that the milled flat portion faces the set screws. As the set screws are tightened down, the shaft is rotated automatically to the proper position, and as long as the set screws engage the shaft along the milled flat, the shaft will be positioned properly with respect to the factory set shaft alignment. By this relatively simple expedient the problem of rotational orientation of the shaft is eliminated, thereby eliminating one source of excessive shaft whip.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a portable agitator wherein a vertically depending driven shaft of substantial free length includes a hollow tube having a solid generally cylindrical shaft secured thereto and is provided with a propeller at one thereof, an improved shaft locking assembly for securing the solid shaft in telescoping relation to the hollow tube, comprising a collet positioned over said tube and having at least two spaced threaded apertures disposed lengthwise thereon, said tube having at least two spaced apertures each aligned with one of the apertures in said collet, said solid shaft being provided with a flat section located along the cylindrical surface thereof facing each said aperture in said tube, and set screw means positioned in said threaded apertures and extending through said collet and said tube for engagement with said flat section to position said shaft within said tube in firm driving relation therewith and releasable to allow adjustment of said shaft while preventing removal of said shaft from said tube, said flat section of said shaft being greater in length than the length of said collet for allowing telescoping movement of said shaft within said tube thereby to provide adjustment of the effective free length of said shaft.

2. In a portable agitator wherein an agitator shaft of substantial free length is provided with a propeller at one end thereof, and which includes a motor driven hollow tube releasably and adjustably connected in telescoping relation to a solid generally cylindrical shaft, an improved shaft locking assembly for securing said solid shaft to said tube, comprising a cylindrical collet having a diameter approximately equal to the outer diameter of said tube positioned around said tube and having a pair of threaded apertures disposed lengthwise along the axis of said tube, said tube having a pair of apertures disposed therein each aligned with one of the apertures in said collet, said solid shaft being provided with a flat section located along the cylindrical surface thereof facing said apertures in said tube, set screw means positioned in said threaded apertures and extending through said collet in said tube for releasable engagement with said flat section to position said solid shaft within said tube in firm driving relation therewith while preventing removal of said shaft therefrom, and said flat section having a lengthwise dimension so as to allow adjustment of the effective length of the agitator shaft by moving said solid shaft relative to said tube.

3. In a portable agitator wherein a vertically depending agitator shaft of substantial free length is provided with a propeller at one end thereof, and wherein the agitator shaft supported by a bearing includes a motor driven hollow tube and a solid shaft releasably and adjustably connected in telescoping relation with said tube, an improved shaft locking assembly for securing said solid shaft to said driven tube, comprising a cylindrical collet positioned around said tube and below the bearing and having a pair of threaded apertures disposed lengthwise along the axis thereof, said tube having a pair of apertures each aligned with one of the apertures in said collet, said shaft being provided with a flat section located along the cylindrical surface thereof facing said apertures in said tube and being greater in length than the length of said collet, set screw means threaded in said collet apertures and extending through the apertures in said tube for engagement with said flat section to position said shaft within said tube in firm driving relation therewith, and said screw means being disengageable from said flat section to allow movement of said shaft within said tube for adjusting the effective length of said agitator shaft while preventing removal of said shaft from said tube.

4. A portable agitator assembly comprising a vertically depending agitator shaft having substantial free length and provided with a propeller at one end thereof, said agitator shaft including a driven hollow tube supported by a bearing, means to drive said hollow tube, a solid cylindrical shaft having an outer diameter approximately equal to the inner diameter of said tube positioned within said tube in telescoping relation therewith, said tube having a pair of spaced apertures below said bearing disposed lengthwise along the axis of said tube, a cylindrical collet positioned over said tube and below said bearing, said collet having a pair of threaded apertures disposed along the axis thereof each of which is in alignment with one of the apertures in said tube, said shaft being provided with a flat section located along the cylindrical surface thereof facing each said aperture in said tube and being greater in length than the length of said collet, set screw means threaded in said collet apertures and extending through the apertures in said tube for engagement with said flat section to position said shaft within said tube in firm driving relation therewith, and said screw means being disengageable from said flat section to allow movement of said shaft within said tube for adjusting the effective length of the agitator shaft while preventing removal of said shaft from said tube.

5. A portable agitator assembly comprising a vertically depending agitator shaft having substantial free length and provided with a propeller at one end thereof, said agitator shaft including a driven tube having a slightly eccentric bore therein defining a tubular wall which includes a relatively thin and relatively thick portion, means to drive said tube, a solid cylindrical shaft having an outer diameter slightly smaller than the inner diameter of said tube positioned within said tube in telescoping relation therewith, said tube having a pair of spaced apertures in said thin portion disposed lengthwise along the axis thereof, a cylindrical collet positioned over said tube including a pair of threaded apertures disposed therein each being in alignment with one of the apertures in said tube, said shaft being provided with a flat section facing each said aperture in said tube, set screw means threaded in said collet apertures and extending through the apertures in said tube for engagement with said flat section to position said shaft against said thicker portion of said tube and in driving relation therewith with the position of said shaft relative to the thicker portion of said tube acting to effect substantial elimination of shaft whip due to the eccentricity of said bore.

6. A portable agitator assembly comprising a vertically depending agitator shaft having substantial free length and provided with a propeller at one end thereof, said agitator shaft including a driven hollow tube supported by a bearing, said tube including an eccentric bore defining relatively thin and thick wall sections, means to drive said hollow tube, a solid cylindrical shaft having an outer diameter slightly smaller than the inner diameter of said tube positioned within said tube in telescoping relation therewith, said tube having a pair of spaced apertures in said thin portion disposed lengthwise along the axis therof and positioned below said bearing, a cylindrical collet positioned over said tube and below said bearing, a pair of threaded apertures disposed in said collet each being in alignment with one of the apertures in said tube, said shaft being provided with a flat section facing each said apertures in said tube and being greater in length than the length of said collet, set screw means threaded in said collet apertures and extending through the apertures in said tube for engagement with said flat section to position said shaft against the thicker portion of said tube and in driving relation therewith, said screw means being disengageable from said flat section to allow movement of said shaft within said tube for adjusting the effective length of the agitator shaft, and the position of said shaft relative to the thicker portion of said tube acting to effect substantial elimination of shaft whip due to the eccentricity of said bore.

References Cited in the file of this patent

UNITED STATES PATENTS

| | | |
|---|---|---|
| 607,771 | Sexsmith | July 19, 1898 |
| 913,986 | Sharp | Mar. 2, 1909 |
| 2,322,803 | Koch | June 29, 1943 |
| 2,565,776 | Monroe | Aug. 28, 1951 |
| 2,577,896 | Kinton | Dec. 11, 1951 |
| 2,610,513 | Rodell | Sept. 16, 1952 |
| 2,930,597 | Howell et al. | Mar. 29, 1960 |